United States Patent Office 3,174,804
Patented Mar. 23, 1965

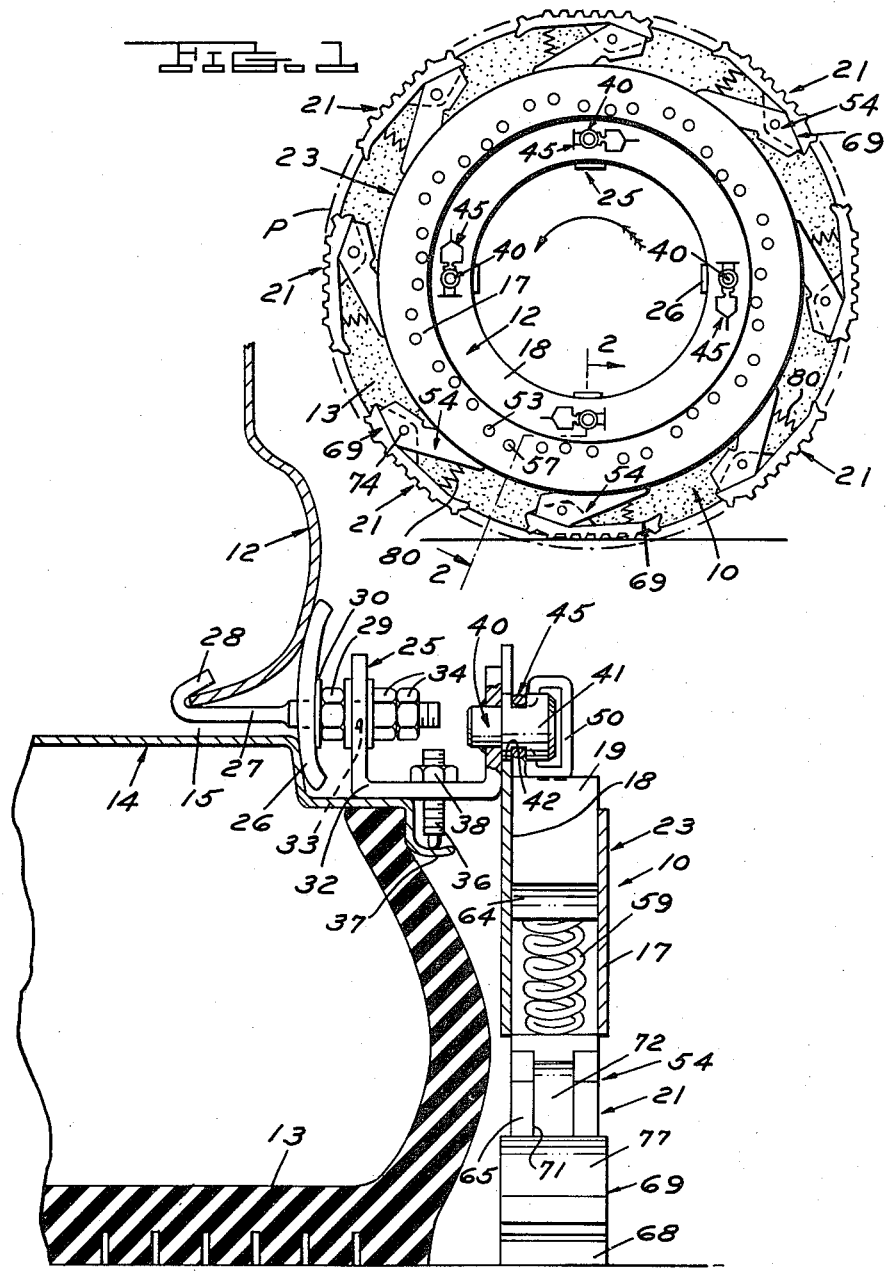

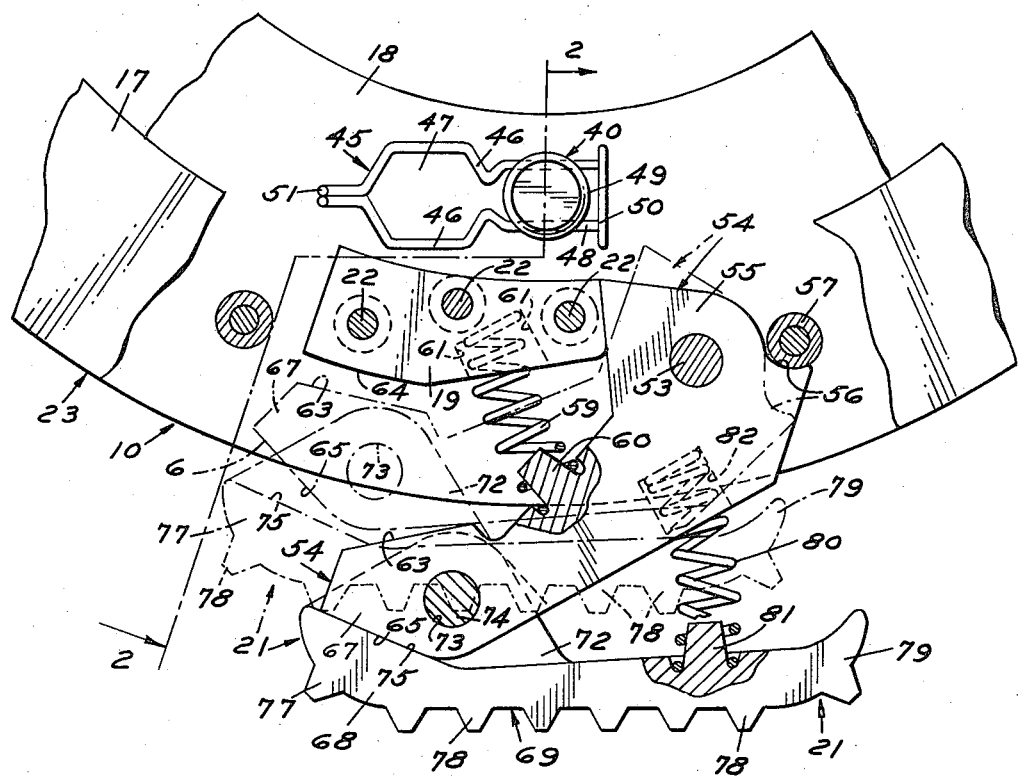

3,174,804
ICE TRACTION WHEEL
Lawrence E. Podger, 28530 Parkwood Drive,
Inkster, Mich.
Filed Dec. 2, 1963, Ser. No. 327,357
9 Claims. (Cl. 301—51)

The present invention relates to an improved ice traction wheel for seasonal application to automotive vehicles. As such, the improvement of the invention has provision enabling the wheel to be totally disassembled from the automotive wheel in seasons such as spring, summer and fall when it is not needed, to assemble only certain basic attaching clip means to the automobile wheel at the outset of the winter season, and to later complete the assembly by mounting the remainder of the traction wheel structure to such clip provisions when added ice traction is a day-to-day requirement.

A general object of the invention is to provide an ice traction wheel, by which the mounting and releasing of its structure to and from the automobile wheel may be accomplished with great ease and speed.

Another object of the invention is to provide an ice traction wheel including a comparatively large number of ice or snow traction shoe assemblies, each including a supporting foot pivotally mounted directly to a basic ring unit of the wheel, and a cleat-type traction shoe pivotally mounted directly on the foot, with spring means respectively urging the foot outwardly about its pivotal axis to the ring unit and the shoe radially outwardly about its pivot to the foot. The relationship of the shoes to the automobile wheel's ground engaging tire, as mounted by the ring unit, is such that in a fully outwardly expanded position of the foot and shoe components of each traction assembly, each shoe extends a slight distance radially outwardly beyond the tread of the tire, in position to take engagement with the frozen ground or traction surface as the shoes follow the rotative path of the tire tread.

Further in accordance with the invention, the foot of each shoe assembly is mounted to the basic ring unit on a pivot adjacent one end of the foot which approaches a bottom horizontal tangent to the ring unit as the wheel rolls forward, while the shoe of the assembly has its pivot to the foot adjacent the opposite end of the latter. As thus pivoted, the traction shoe extends to a free extremity facing to the rear when in engagement with the ground or other traction surface. In the order of functioning, the free rear shoe end, as spring biased away from the mounting foot of the assembly, first engages the ground, the shoe progressively taking traction engagement along its full rear-front dimension, and having full-length engagement at its cleated bottom surface with the ground when the shoe assembly is at the vertical center line and the bottom of the ring unit mounting the traction wheel to the automobile wheel. I find that this scheme or sequence of continuous operation, arising when the cleated traction shoe first engages the ground at a rear non-pivoted end, results in a quieter operation than is possible in a different scheme of shoe arrangement; and the ground engaging force as transmitted to the automobile wheel through the wheel engaged ring unit of the invention is fully effective for its intended purpose.

A further object is to provide a snow and/or ice traction wheel, comprised of a predetermined number of relatively closely spaced traction shoe assemblies, a mounting ring unit and a plurality of clip units for releasably mounting the improvement to the automobile wheel, the arrangement being such that the traction wheel is dynamically well balanced in operation and provides a smooth, substantially continuous succession of traction engagements with the ground as the wheel rolls forwardly.

Specifically, in a traction wheel having the arrangement of mounting ring and shoe assembly features mentioned above, it is an object to provide very simple means for assembling and dismantling the traction wheel relative to the automobile. Such provisions take the form of a plurality of wheel hub-engaging hook devices, a plurality of simple clips adapted to be mounted to the hook devices, as required, plus releasable spring type means for mounting the ring and traction shoe assembly on these clips. Thus, for example, in the late fall, the rim hooks may be mounted to the automobile wheel as a preparatory or precautionary matter. Then, later on as demanded by the weather, the clip and ring-shoe components may be assembled to one another and to the hook units. This is done in a few moments' time expended at each of the rear traction wheels of the vehicle.

The foregoing as well as other objects will become more apparent as this description proceeds, especially when considered in connection with the accompanying drawings illustrating the invention, wherein:

FIG. 1 is a side elevational view showing the improved traction wheel of the invention as operatively applied to an automobile wheel, the furthermost outer orbit of the cleated shoe sub-assemblies of the traction wheel being indicated in dot-dash line;

FIG. 2 is a fragmentary enlarged scale view in generally radial cross section along line 2—2 of FIGS. 1 and 3;

FIG. 3 is a fragmentary side elevational view, partially broken away, illustrating basic components of an individual shoe assembly of the wheel, an operative ground-engaging position being indicated in solid line and a more retracted position being indicated in dot-dash line;

FIG. 4 is a perspective view of a mounting stud of one of the clip units of the wheel;

FIG. 5 is a perspective view of a spring engageable with a stud to mount the ring-traction foot assembly to a clip;

FIG. 6 is a bottom plan view of a pivotal-type mounting foot of an individual shoe assembly, other features of which are determinable from the other drawings; and FIG. 7 is a top plan view of an individual traction shoe, other features of which are determinable from the other drawings.

The improved snow and/or ice traction wheel of the invention is generally designated by the reference numeral 10, being shown in FIG. 1 of the drawings as operatively applied to an automobile wheel, the usual stamped sheet metal hub extension of which is designated by the numeral 12; while a wheel tire 13 is conventionally shown in FIG. 2 as being mounted to a wheel rim 14. Typically, the formation of the stamped wheel member 12 is such as to leave a plurality of axially extending openings 15, for example four in number and equal spacing, between member 12 and rim 14.

The traction wheel 10 basically comprises a flat circular outer ring 17, a circular inner ring 18 coextensive in outer diameter with ring 17, but of substantially greater radial width, and a plurality of spacer blocks 19, for example eight in number, interposed between and equally spaced about the rings 17, 18, since the wheel as depicted in FIG. 1 utilizes eight traction shoe assemblies, generally designated 21. The rings 17, 18 are fixedly held together with the interposed spacer blocks 19, as by bolts or studs 22 extending therethrough (FIG. 3), to constitute with the spacers 19 a mounting ring assembly 23 of the wheel 10. The traction shoe and foot assemblies 21 are mounted to ring assembly or unit 23 in a manner to be described.

Further basic components of wheel 10 are a series of individual mounting clip units, generally designated 25. There may be four of these units, substantially equally spaced about the wheel at the hub extension openings 15. Each clip unit 25 comprises a pressure plate 26 (FIG. 2) of mildly curved outline adapted to bear inwardly against hub extension 12 and rim 14, outwardly bridging the zone of space 15; and through each pressure plate 26 there extend two circumferentially spaced hooks 27, whose reversely bent ends 28 engage about the inner portion of hub extension 12.

Take-up nuts 29 and washers 30 are applied to the respective hooks 27 to clamp each pressure plate 26 tightly to the automobile wheel; and to this extent only need each clip unit 25 be applied to the automobile wheel, prior to the winter season, the remainder of clip unit 25 being assembled later on. Such remainder of the clip unit 25 comprises, for each unit, a clip bracket 32 of U-shaped outline having its inner wall perforated in two places at 33 (FIG. 2) to receive the outer ends of the hooks 27. Lock nuts 34 are then threaded tightly on the hook ends to complete the assembly of clip or bracket 32 to the applied pressure plate 26. The horizontal web portion of bracket 32 threadedly receives an adjustment set screw 36 to engage an outer rim bead 37 for the purpose of adjusting and centering the clips (hence the mounting ring assembly 23 as mounted to such clips) relative to the automobile wheel. Lock nuts 38 secure the adjustment screws 36 in final position.

The outer flange of each U-bracket or clip member 32 has an axially extending opening in which is welded an axially extending, ring-mounting stem or stud 40, specially shown in FIG. 4. It comprises an enlarged cylindrical body portion 41 received in an opening 42 of inner mounting ring 18 in axial abutment with the flange of the clip 32 to which the member 40 is welded, as shown in FIG. 2. The stud body 40 is formed to provide diametrically opposed, chord-like slots or recesses 43 which lie directly outwardly of mounting ring 18 when the ring unit or assembly 23 is in the operative position of FIG. 2.

The ring assembly is applied by slipping its openings 42 over the respective studs 40, thereby centering the assembly relative to the automobile wheel, and special wire spring components 45 are employed to lock assembly 23 to the clip units 25, thus releasably retaining wheel 10 in place.

As shown best in FIG. 5, each locking or retaining spring 45 is formed of a single length of resilient wire stock. This piece is bent to provide parallel leg portions 46, each formed to define an access or application opening or bay at 47, at which the spring 45 may be slipped over the body 41 of a clip stem or stud 40. Inwardly bent shoulders on the wire arms at 48 separate the bay 47 from a slot formation 49, the width of which approximates the width of stud body 41 between its chord slots 43; and the spring 45 is then formed 90° outward at 50 to provide a finger or impact part. The opposite end of spring 45, i.e., at its unconnected terminal fingers 51, is also formed 90° outwardly for engagement by hand or by an impact tool in releasing the spring from its locked position of FIG. 2 to permit dismantling of the mounting ring unit or assembly 23.

Thus it is seen that the arrangement of clip units 25 and springs 45 affords a very quick and easy means for mounting and dismantling the traction wheel 10 to the automobile wheel as seasonal conditions require or permit.

Referring now particularly to FIG. 3, the outer and inner rings 17, 18, respectively, of ring unit 23, as held in parallel axially spaced relation to one another by the spacer blocks 19, receive axially extending bolts or studs 53 to provide in the space between those rings a primary pivot for each of the traction foot and shoe assemblies 21, on which pivot stud 53 a foot member, generally designated 54, of the assembly 21 is pivotally mounted at what may be termed a rear heel portion 55 of the foot. This heel portion has an arcuate outer formation at 56 adapted to abut against a further stud or stop 57 between rings 17 and 18, thus to limit outward swing of foot 54 about pivot 53, i.e., to the solid line position of the foot, as shown in FIG. 3. (See also FIG. 1.)

The foot 54 is biased counterclockwise (FIG. 3) about pivot stud 53 through the agency of a relatively strong coil compression spring 59, which is piloted by an inwardly extending projection 60 integral with foot 54 and a recess 61 in the bottom of spacer block 19. Thus spring 59 urges foot 54 from an inwardly retracted, dot-dash line position to an outwardly projected solid line position, as viewed in FIG. 3. At a point remote from its pivot at 53 the foot 54 has a flat inner surface 63 which may engage inwardly against a bottom or outer surface 64 of spacer block 19 to positively limit any possible excessive inward movement about the pivot 53. In radially outwardly spaced relation to the stop surface 63, the foot 54 has further flat stop surfaces at 65, for a purpose to be described.

The stop surfaces 63, 65 define opposite inner and outer sides of a forward toe portion 67 of the foot 54, in which zone the forward portion 68 of a shoe component 69 of assembly 21 is pivoted to the foot. For this purpose, the foot is, as illustrated in FIG. 6, provided with a forwardly opening central slot 71 in its toe portion 67, and the shoe 69 is provided with an integral, radially inwardly extending boss or ear 72 of triangular shape (FIG. 7) which is apertured at 73 to receive a pin 74 articulating the shoe 69 to the foot 54, the pin 74 also extending through aligned openings 75 in the foot's toe 67. A stop face 75' is formed on the forward end of shoe 69.

The forward or toe end 77 of shoe 69 is of inwardly arcuate outline, and it is provided along its length with spaced traction cleats 78, terminating at its rear in a cleated, inwardly arcuate heel portion 79.

A relatively strong coil spring 80, piloted on an integral inward projection 81 of shoe 69 and received in an opening 82 of foot 54, urges shoe 69 radially outwardly away from the foot, i.e., from the dot-dash line position of FIG. 3 to the solid line, ground engaging position of that figure. Stop faces 65, 75 limit this position.

As indicated above, the shoe assemblies 21, as normally expanded by springs 59 and 80 and out of ground engagement, follow the orbit or path P shown in dot-dash line in FIG. 1 of the drawings. With the attached traction wheel 10 traveling forwardly in the direction indicated by the arrow in FIG. 1, and as thus normally expanded, the rear or heel portion 79 of each shoe assembly 21 first engages the ground or other traction surface, causing shoe 69 to pivot or rock against the force of spring 80, and progressively against the force of the foot-to-ring spring 59, as the cleats 78 of the shoe progressively engage the ground. Full flatwise engagement takes place at the bottom of the shoe travel, as shown in FIG. 1. The springs 59, 80 are quite strong compression springs, and reaction forces exist which drive the shoe strongly against the traction surface. As indicated above, I have found that an arrangement of the shoe-foot assemblies 21 as herein shown and above described, i.e., with shoe 69 pivoted at its forward end (in respect to vehicle travel) to a forward toe end of the foot 54, and with the heel portion 79 of shoe 69 free at the rear, produces not only the desired effective force grip on the ground, but also does this with less noise than other arrangements which have been attempted.

The parts of the traction wheel 10 are very simple and inexpensively produced, though amply rugged for their demanding function. The unit is well balanced dynamically in travel, and a relatively large number of shoe assemblies 21 insures a substantial continuity of traction effort. In no angular position of the wheel 10 is there less than one asembly well engaged tractionally with the ground.

The provisions, best shown in FIGS. 2, 4 and 5, for releasably mounting the components of wheel 10 have the same advantage of simple, inexpensive and rugged design, and are capable of being manipulated with ease and speed by a quite inexperienced user.

What I claim as my invention is:

1. A traction wheel comprising a supporting unit to be mounted on a vehicle wheel, a circumferential series of traction shoe units mounted on said supporting unit to project radially outwardly thereof for traction engagement with a surface traversed by the vehicle wheel, each shoe unit comprising a mounting foot pivoted on said unit, a shoe pivoted on said foot, and means resiliently urging said shoe and foot radially outwardly both away from one another and away from said supporting unit.

2. A traction wheel comprising a supporting unit to be mounted on a vehicle wheel, a circumferential series of traction shoe units mounted on said supporting unit to project radially outwardly thereof for traction engagement with a surface traversed by the vehicle wheel, each shoe unit comprising a mounting foot having a rear heel portion pivoted on said unit and a toe portion extending forwardly of said pivoted heel portion, in reference to the direction of wheel traverse, a shoe pivoted on said foot toe portion, and means resiliently urging said shoe and foot radially outwardly both away from one another and away from said supporting unit.

3. A traction wheel comprising a supporting unit to be mounted on a vehicle wheel, a circumferential series of traction shoe units mounted on said supporting unit to project radially outwardly thereof for traction engagement with a surface traversed by the vehicle wheel, each shoe unit comprising a mounting foot pivoted on said unit, a shoe pivoted on said foot, and means resiliently urging said shoe and foot radially outwardly both away from one another and away from said supporting unit, comprising compression springs respectively acting independently between said shoe and foot and said foot and supporting unit.

4. A traction wheel comprising a ring unit to be mounted concentrically on a vehicle wheel, a circumferential series of traction shoe units mounted on said ring unit to project radially outwardly thereof for traction engagement with a surface traversed by the vehicle wheel, said ring unit comprising inner and outer rings rigidly spaced axially from one another, each shoe unit comprising a mounting foot pivoted on said ring unit between said rings, a shoe movably mounted on said foot, and means urging said shoe radially outwardly away from said ring unit, and means to releasably mount said ring unit to said vehicle wheel.

5. A traction wheel comprising a ring unit to be mounted concentrically on a vehicle wheel, a circumferential series of traction shoe units mounted on said ring unit to project radially outwardly thereof for traction engagement with a surface traversed by the vehicle wheel, said ring unit comprising inner and outer rings rigidly spaced axially from one another, each shoe unit comprising a mounting foot pivoted on said ring unit between said rings, a shoe movably mounted on said foot, and means urging said shoe radially outwardly away from said ring unit, and means to releasably mount said ring unit to said vehicle wheel, comprising a series of clip units each including a clip having means to releasably secure the same fixedly to said vehicle wheel, said clip having a member to fixedly engage the inner ring of said ring unit, and a device releasably engageable with said clip member to hold the ring unit in fixed concentric relation to the vehicle wheel.

6. A traction wheel comprising a ring unit to be mounted concentrically on a vehicle wheel, a circumferential series of traction shoe units mounted on said ring unit to project radially outwardly thereof for traction engagement with a surface traversed by the vehicle wheel, said ring unit comprising inner and outer rings rigidly spaced axially from one another, each shoe unit comprising a mounting foot having a rear heel portion pivoted on said ring unit between said rings and a toe portion extending forwardly of said pivoted heel portion, in reference to the direction of wheel traverse, a shoe having a forward toe portion pivoted on said foot toe portion and extending to a free rear heel portion of the shoe, said shoe heel and toe portions being convexly rounded, and means urging said shoe and foot radially outwardly away from one another and from said ring unit, and means to releasably mount said ring unit to said vehicle wheel, comprising a series of clip units each including a pressure plate having means to releasably mount the same to the outer side of the vehicle wheel, a clip having means to releasably secure the same fixedly to said pressure plate, said clip having a member to fixedly engage the inner ring of said ring unit through an aperture in the latter, and a device releasably engageable with said clip member on a side of said inner ring opposite said clip to hold the ring unit in fixed concentric relation to the vehicle wheel.

7. A traction wheel comprising an annular supporting unit to be mounted concentrically on a vehicle wheel, a circumferential series of traction shoe units mounted on said supporting unit to project radially outwardly thereof for traction engagement with a surface traversed by the vehicle wheel, and means to releasably mount said traction wheel to said vehicle wheel, comprising a series of clip units each including a pressure plate having means to releasably mount the same to the outer side of the vehicle wheel, a clip having means to releasably secure the same fixedly to said pressure plate, said clip having a member to fixedly engage said supporting unit through an aperture in the latter, and a device releasably engageable with said clip member on a side of said inner ring opposite said clip to hold the supporting unit in fixed relation to the vehicle wheel.

8. A traction wheel comprising an annular supporting unit to be mounted concentrically on a vehicle wheel, a circumferential series of traction shoe units mounted on said supporting unit to project radially outwardly thereof for traction engagement with a surface traversed by the vehicle wheel, each shoe unit comprising a mounting member pivoted on said supporting unit, and a shoe pivoted on said mounting member, and means to releasably mount said traction wheel to said vehicle wheel, comprising a series of clip units each including a clip having means to releasably secure the same fixedly to said vehicle wheel, said clip being adapted to fixedly engage said supporting unit, and a device releasably engageable with said clip to hold the supporting unit in fixed relation to the vehicle wheel.

9. A traction wheel comprising a ring unit to be mounted concentrically on a vehicle wheel, a circumferential series of traction shoe units mounted on said ring unit to project radially outwardly thereof for traction engagement with a surface traversed by the vehicle wheel, said ring unit comprising inner and outer rings rigidly spaced axially from one another, each shoe unit comprising a mounting foot having a rear heel portion pivoted on said ring unit between said rings and a toe portion extending forwardly of said pivoted heel portion, in reference to the direction of wheel traverse, a shoe having a forward toe portion pivoted on said foot toe portion and extending to a free rear heel portion of the shoe, and means urging said shoe and foot radially outwardly away from one another and from said ring unit, said ring unit being engageable by said shoe units to limit radial outward movement of the shoes, and means to releasably mount said traction wheel to said vehicle wheel, comprising a series of clip units each including a clip having means to releasably secure the same fixedly to said vehicle wheel and the inner ring of said ring unit, and a device releasably engageable with said clip on a side of said inner ring opposite said vehicle wheel to hold the ring unit in fixed concentric relation to said vehicle wheel.

References Cited by the Examiner

UNITED STATES PATENTS

| | | | |
|---|---|---|---|
| 2,496,924 | 2/50 | Weeks | 301—51 |
| 2,899,241 | 8/59 | Colin | 301—47 |
| 3,112,138 | 11/63 | Kauer | 301—47 |

ARTHHUR L. LA POINT, *Primary Examiner.*